United States Patent [19]
Tobias et al.

[11] Patent Number: 6,046,249
[45] Date of Patent: Apr. 4, 2000

[54] DIMENSIONAL STABILIZING, CELL OPENING ADDITIVES FOR POLYURETHANE FLEXIBLE AND RIGID FOAMS

[75] Inventors: James Douglas Tobias, Topton; Julia Renae Bennett, Bethlehem; Gary Dale Andrew, Walnutport; John Elton Dewhurst, Macungie; Robert G. Petrella, Allentown, all of Pa.

[73] Assignee: Air Products and Chemicals, Inc., Allentown, Pa.

[21] Appl. No.: 09/338,105

[22] Filed: Jun. 23, 1999

Related U.S. Application Data

[63] Continuation-in-part of application No. 09/098,675, Jun. 17, 1998.

[51] Int. Cl.[7] ..................... C08G 18/00
[52] U.S. Cl. ................ 521/172; 521/138; 521/155; 521/157; 521/159; 521/180; 528/65; 528/66; 528/83
[58] Field of Search ...................... 521/138, 155, 521/157, 159, 172, 180; 528/65, 66, 83

[56] References Cited

U.S. PATENT DOCUMENTS

| | | | |
|---|---|---|---|
| 4,211,849 | 7/1980 | Kollmeier et al. | 521/164 |
| 4,701,474 | 10/1987 | Bailey, Jr. et al. | 521/137 |
| 4,751,253 | 6/1988 | Tylends | 521/114 |
| 4,785,027 | 11/1988 | Brasington et al. | 521/157 |
| 4,929,646 | 5/1990 | Nichols et al. | 521/137 |
| 5,179,131 | 1/1993 | Wujcik et al. | 521/130 |
| 5,489,618 | 2/1996 | Gerkin | 521/128 |

FOREIGN PATENT DOCUMENTS

| | | |
|---|---|---|
| 471260A | 8/1992 | European Pat. Off. . |
| WO98/06673 | 3/1995 | WIPO . |

*Primary Examiner*—Samuel A. Acquah
*Attorney, Agent, or Firm*—Michael Leach

[57] ABSTRACT

A method for preparing a polyurethane flexible or rigid foam by reacting an organic polyisocyanate with a polyol in the presence of urethane catalyst, water as a blowing agent, optionally a silicone surfactant, and a cell opener characterized in that the cell opener comprises the reaction product of a C1–C20 hydrocarbyl group-containing organic acid anhydride and a substituted phenol which may be alkoxylated or an alkoxylated primary alcohol, optionally reacted in the presence of a tertiary amine urethane catalyst.

20 Claims, No Drawings

DIMENSIONAL STABILIZING, CELL OPENING ADDITIVES FOR POLYURETHANE FLEXIBLE AND RIGID FOAMS

CROSS-REFERENCE TO RELATED APPLICATION

This application is a continuation-in-part of application Ser. No. 09/098,675 filed Jun. 17, 1998, which is incorporated by reference.

FIELD OF THE INVENTION

The invention relates to making polyurethane flexible and rigid foams using dimensional stabilizer/cell openers.

BACKGROUND OF THE INVENTION

Flexible molded polyurethane foam requires mechanical crushing to open foam cells and prevent shrinkage and to improve dimensional stability of the foam pad. Current mechanical methods for cell opening consist mainly of crushing, vacuum rupture or time pressure release.

Upon demold, mechanically crushing and breaking the polyurethane foam cells enables the polyurethane foam to be more dimensionally stable. Another method of breaking the cells is vacuum crushing which involves drawing a vacuum on the finished polyurethane foam causing cell rupture. The overall effect of these methods is reduced foam shrinkage.

Other mechanical attempts have been made to achieve dimensionally stable foam, such as decreasing cycle production times. For example, demolding the polyurethane foam in three minutes as compared to four minutes will dramatically improve the dimensional stability. However, this can lead to deformation, tearing, or distortion of the polyurethane foam due to undercure.

Another method for producing dimensionally stable foam is time pressure release (TPR). TPR comprises opening the mold during the curing process to release the internal pressure and then reclosing for the duration of the cure time. The sudden release of the internally generated pressure bursts the cell windows, thereby obtaining an open cell foam. The effect of TPR can be varied by performing the TPR at different stages in the curing process, and by varying the length of time the mold is opened before reclosing. This pressure release is performed only once during the cure time of each polyurethane foam. This process may cause corner blowouts, surface defects, and dimensional distortions and, if the defect is severe enough. it will result in scrap polyurethane foam. These discrepancies are considered minor compared to the effect of TPR and its ability to open the foam. Additionally, upon demold the foam must also be subjected to mechanical or vacuum crushing since TPR does not completely provide the necessary energy to totally open cells in the foam.

Mechanical methods usually result in incomplete or inconsistent cell opening and require a flexible molded foam producer to invest in additional machinery. A chemical method for cell opening would be preferred.

Rigid polyurethane foam has a closed cell structure by its nature, but some applications require an open cell structure. Cell openers could lead to dimensional stability improvements in various rigid applications or could provide the open cell structure required for rigid foam filled vacuum panels. It would be desirable to have a chemical additive that would open the cells of a foam since mechanical crushing is not an option for rigid foams.

U.S. Pat. No. 4,929,646 discloses preparing flexible polyurethane foams using certain high molecular weight, high functionality poly(oxyethylene) compounds as cell openers and softeners.

U.S. Pat. No. 4,751,253 discloses a cell opening, dimensionally stabilizing additive for making flexible polyurethane foam which additive comprises an ester reaction product of a long chain acid with polyethylene or polypropylene glycols and/or contains free acid to provide for desired acid value.

U.S. Pat. No. 4,701,474 discloses the use of acid grafted polyether polyols, such as acrylic acid grafted poly(alkylene oxides), as reactivity controllers in the production of polyurethane foam.

U.S. Pat. No. 4,785,027 discloses preparing polyurethane foams in the presence of polyether mono- or diacids, with the acid functional groups at the ends of the polymer chain. Such polyether acids reportedly delay the initial reaction rate without increasing foam tightness.

U.S. Pat. No. 5,489,618 discloses polyurethane foam prepared in the presence of a salt of a tertiary amine and a carboxylic acid having hydroxyl functionality as a catalyst. Reportedly, the flexible foams produced are more dimensionally stable and have a decreased tendency to shrink.

U.S. Pat. No. 5,179,131 discloses that the addition of mono- or dicarboxylic acids to polyurethane foam formulations made using polyisocyanate polyaddition polymer polyol dispersions (PIPA) results in a reduction of foam shrinkage. Functional groups attached to the acid are either alkyl or alkylene.

U.S. Pat. No. 4,211,849 discloses a process for making open celled, crosslinked foams using as the crosslinker a crystalline polyhydroxy material having at least three hydroxy groups.

EP 471 260A discloses the use of organic acids or their alkali salts for the production of open cell polyurethane foam. It is stated that incorporation of these materials gives foam with markedly lower forced to crush values.

WO 9506673 discloses alkali metal and alkaline earth metal salts of alkyl and alkenyl succinic acids as catalysts for production of polyurethane and/or polyurea foam.

SUMMARY OF THE INVENTION

The invention provides a method for preparing polyurethane flexible and rigid foams using certain organic monoesters. The method comprises reacting an organic polyisocyanate and a polyol in the presence of a catalyst composition, a blowing agent, optionally a silicone surfactant cell stabilizer, and as a dimensionally stabilizing, cell opening agent a composition which is the mono-ester reaction product of an organic acid anhydride and a substituted phenol or primary alcohol which are both preferably alkoxylated. By "mono-ester" is meant that an organic acid anhydride molecule reacts with only one hydroxyl group. When the reaction is performed in the presence of a tertiary amine polyurethane catalyst, the resulting product is the tertiary ammonium salt of the mono-ester which can function as a both a catalyst and a dimensional stabilizer/cell opener.

The use of these mono-ester reaction products in making polyurethane foam provides the following advantages:

- the polyurethane foams (flexible molded, flexible slabstock and rigid) manifest reduced shrinkage which provides for improved dimensional stability
- a significant reduction in the force necessary to crush freshly demolded flexible foam without adversely affecting the physical properties of the foam the polyurethane cellular structure exhibits a more uniform and consistent gradient within the medium or "bulk" of the polyurethane part cellular structure is not degraded and is visually more evenly distributed at or near the pour surface and throughout the polyurethane article foams often display similar force-to-crush values as obtained with the TPR process without any physical deformation of the foam pads normally associated with TPR.

For purposes of this invention and as is understood by many in the art, flexible molded foams include microcellular foams such as those used in shoe soles and steering wheels.

DETAILED DESCRIPTION OF THE INVENTION

The mono-ester stabilizer/cell openers used in the preparation of the flexible molded, flexible slabstock and rigid foams are the reaction product of an organic acid anhydride and a hydroxyl compound which is a substituted phenol, preferably an alkoxylated substituted phenol, or a primary alcohol, preferably an alkoxylated primary alcohol, in which the polyalkylene oxide moiety of the substituted phenol or primary alcohol may comprise ethylene oxide, propylene oxide, butylene oxide or a blend thereof, but preferably is polyethylene oxide $(EO)_x$ or polypropylene oxide $(PO)_x$. The number of polymerized alkylene oxide units may range from 1 to 20. The mono-ester reaction product is used in the polyurethane foam composition at levels of 0.05 to 0.5, preferably about 0.2, parts by weight per hundred parts of polyol (pphpp).

The mono-ester reaction product may be expressed by formula I

X—Y—Z          I where X represents hydrogen or preferably a saturated or unsaturated hydrocarbon group of 1 to 20 carbon atoms;

Y represents an organic acid anhydride residue carried terminally on the X group and having a free carboxylic acid or carboxylate group; and Z represents the residue of a primary alcohol, preferably an alkoxylated primary alcohol, or substituted phenol, preferably alkoxylated substituted phenol linked through its oxygen atom to Y via an ester functionality.

The X group is preferably a saturated or unsaturated aliphatic hydrocarbon chain which has a molecular weight from about 15 to about 281 and especially from about 113 to about 225. Thus, the X group preferably contains at least 8 carbons and up to about 16 carbons and can be linear or branched.

Examples of such groups are nonyl, decyl, decenyl, dodecyl, dodecenyl, hexadecyl, octadecyl, octadecenyl and long alkyl chains such as those obtained for example by the polymerization or copolymerization of mono-olefins containing from 1 to 6 carbon atoms, for example, ethylene, propylene, butene-1, butene-2 or isobutylene.

Preferred X groups are those derived from the polymerization of isobutylene or propylene. These polymers can be made by standard methods and are commonly referred to as alk(en)yl polymers. Such polymers have a terminal double bond that can be reacted with maleic anhydride, for example, to form alk(en)yl substituted succinic anhydride derivatives by reaction in the presence of a standard condensation catalyst, for example a halogen such as bromine, to form a compound of formula II

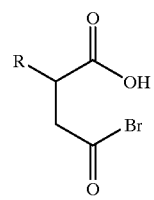

II

The alk(en)yl substituted succinic anhydrides are commercially available and can be used in the form in which they are provided without further purification. Polyisobutylene succinic anhydride is commonly referred to as PIBSA, tetrapropenyl (C12) succinic anhydride (TPSA) is a liquid product consisting of isomers (Heico Chemical) and dodecenyl (C12) succinic anhydride (DDSA) which is a solid material essentially free of isomers (Heico Chemical and Aldrich Chemical).

When the Y group is an aromatic anhydride residue, it is preferably derived from phthalic anhydride, and especially phthalic anhydride wherein the X group is attached in the 4-position relative to the anhydride group. It is preferred, however, that the Y group is a succinic anhydride residue derivable from the succinic anhydride group.

When Y is such a group, it is preferably a divalent group of the formulas

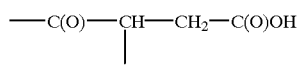

or

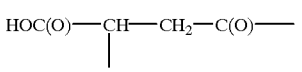

linking the X group to the Z group.

The Z group is preferably the residue of a C3–C20 primary alcohol which is preferably alkoxylated or C1–C20 linear or branched hydrocarbyl substituted phenol which may preferably be alkoxylated.

Suitable organic acid anhydrides for making the mono-esters include, e.g., maleic anhydride, phthalic anhydride, succinic anhydride and any of the foregoing substituted with a C1–C20, preferably C8–C16, linear or branched hydrocarbyl group such as an alkyl or alkenyl group. For example, the hydrocarbyl group of the succinic anhydride may be polyisobutenyl, dodecenyl or tetrapropenyl. The preferred organic anhydrides are dodecenyl (C12) succinic anhydride (DDSA) and tetrapropenyl (C12) succinic anhydride (TPSA).

Useful hydroxyl compounds for reacting with the anhydrides include (a) phenols substituted with C1–C20 linear or branched alkyl groups, preferably C6–C16 alkyls, and alkoxylated with 0–20 moles of an alkylene oxide, preferably 5–20 moles of ethylene oxide; and (b) alkoxylated C3–C20 primary alcohols, preferably C9–C15 primary alcohols alkoxylated with 1–10, preferably 2 to 5 moles, and most preferably 1 to 3 moles, of an alkylene oxide, especially ethylene oxide and C4–C6 primary alcohols alkoxylated with 10–20, preferably 12 to 18 moles, and most preferably 15 to 17 moles, of an alkylene oxide, especially propylene oxide. Illustrative of suitable hydroxy compounds are p-dodecyl phenol, t-butyl phenol, nonyl phenol ethoxylated with about 10 ethylene oxide units, butanol propoxylated with about 16–17 propylene oxide units and Neodol 23-3 alcohol, an ethoxylated linear primary alcohol in which the alcohol comprises a mixture of C12 and C13 linear primary alcohols which are ethoxylated with 3 moles of ethylene oxide (EO) and is available from Shell Chemical Co.

In a preferred embodiment the reaction of the anhydride and the alcohol is catalyzed by a tertiary amine polyurethane catalyst. Suitable catalyst are those tertiary amines well known in the polyurethane art and include, for example, pentamethyl-diethylenetriamine, N-methyl pyrrolidone, N-methyl morpholine, N-ethyl morpholine, N-methylimidazole, 1,2-dimethylimidazole, triethylamine, triethylenediamine (TEDA), bis(dimethylaminoethyl)ether and dimethylcyclohexylamine among others. The tertiary amine is used in excess to afford, as the reaction product, the tertiary ammonium salt of the mono-ester. In such case, the reaction product acts as both a stabilizer/cell opener and a urethane catalyst in that it can replace some of the urethane catalyst typically used in the polyurethane formulation.

The anhydride and alcohol may be reacted in a 1:3 to 3:1 molar ratio, preferably a 1:1 molar ratio. When a tertiary amine is used in the reaction, it is used at greater than stoichiometric amounts, preferably at about 3 moles per mole of anhydride or alcohol, so that the resulting reaction product will conveniently contain an appropriate amount of polyurethane catalyst, blowing or gelling. The stabilizer/opener can be prepared by adding the desired tertiary amine to a reaction vessel followed by the alcohol. Agitation of this mixture is required. Lastly, the desired anhydride is added. Agitation should be continued until the reaction is completed, which is approximately 40–60 minutes as determined by infrared analysis indicating disappearance of anhydride carbonyl and conversion to ester carbonyl. An approximate molar ratio of 3:1:1, tertiary amine: hydroxyl compound: anhydride should be used for optimal performance, although other molar ratios also work. When the components are added in this order, the tertiary amine catalyzes the reaction between the alcohol and the anhydride. This reaction will proceed without the need for heat, although the reaction is exothermic, to produce the stabilizer/opener. The reaction product can be used as is or the mono-ester can be isolated for use by common purification techniques.

A preferred embodiment can be produced by reacting dodecenyl succinic anhydride, DDSA (K-12; Heico Chemical), with a hydroxyl composition comprising 3-molar ethoxylated C12–C13 linear alcohols (Neodol 23-3, Shell Chemical) in the presence of bis(dimethylaminoethyl) ether as the catalyst:

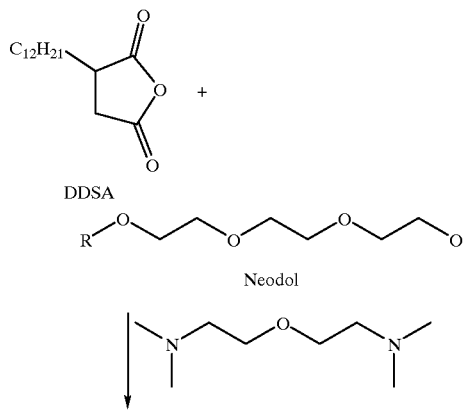

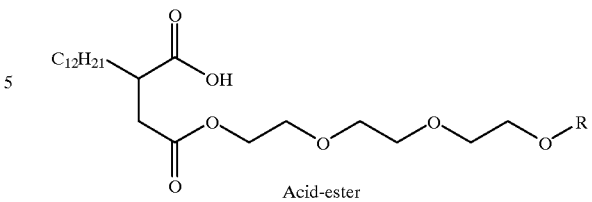

where R depicts C12–C13 alkyl groups. The reaction proceeds readily at ambient temperature and is exothermic. Use of the reaction product in preparing polyurethane foam provides for improved dimensional stability and cell opening.

The stabilizer/cell openers according to the invention are employed in the manufacture of polyether and polyester flexible and rigid polyurethane foams in the manner known to the art. In producing the polyurethane foams using these cell openers, one or more polyether or polyester polyols are employed for reaction with a polyisocyanate to provide the urethane linkage. Such polyols have an average of typically 2.0 to 3.5 hydroxyl groups per molecule.

Illustrative of suitable polyols as a component of the polyurethane composition are the polyalkylene ether and polyester polyols. The polyalkylene ether polyols include the poly(alkylene oxide) polymers such as poly(ethylene oxide) and poly(propylene oxide) polymers and copolymers with terminal hydroxyl groups derived from polyhydric compounds, including diols and triols; for example, among others, ethylene glycol, propylene glycol, 1,3-butane diol, 1,4-butane diol, 1,6-hexane diol, neopentyl glycol, diethylene glycol, dipropylene glycol, pentaerythritol, glycerol, diglycerol, trimethylol propane and like low molecular weight polyols.

In the practice of this invention, a single high molecular weight polyether polyol may be used. Also, mixtures of high molecular weight polyether polyols such as mixtures of di- and trifunctional materials and/or different molecular weight or different chemical composition materials may be used.

Useful polyester polyols include those produced by reacting a dicarboxylic acid with an excess of a diol, for example, adipic acid with ethylene glycol or butanediol, or reacting a lactone with an excess of a diol such as caprolactone with propylene glycol.

In addition to the polyether and polyester polyols, the masterbatches, or premix compositions, frequently contain a polymer polyol. Polymer polyols are used in flexible polyurethane foam to increase the foam's resistance to deformation, i.e. to increase the load-bearing properties of the foam. Currently, two different types of polymer polyols are used to achieve load-bearing improvement. The first type, described as a graft polyol, consists of a triol in which vinyl monomers are graft copolymerized. Styrene and acrylonitrile are the usual monomers of choice. The second type, a polyurea modified polyol, is a polyol containing a polyurea dispersion formed by the reaction of a diamine and TDI. Since TDI is used in excess, some of the TDI may react with both the polyol and polyurea. This second type of polymer polyol has a variant called PIPA polyol which is formed by the in-situ polymerization of TDI and alkanolamine in the polyol. Depending on the load-bearing requirements, polymer polyols may comprise 20–80% of the polyol portion of the masterbatch.

The polyurethane products are prepared using any suitable organic polyisocyanate well known in the art including, for example, hexamethylene diisocyanate, phenylene diisocyanate. toluene diisocyanate (TDI) and 4,4'-diphenylmethane diisocyanate (MDI). Especially suitable are the 2,4- and 2,6-TDI's individually or together as their commercially available mixtures. Other suitable isocyanates are mixtures of diisocyanates known commercially as "crude MDI", also known as PAPI, which contain about 60% of MDI along with other isomeric and analogous higher polyisocyanates. Also suitable are "prepolymers" of these polyisocyanates comprising a partially prereacted mixture of a polyisocyanate and a polyether or polyester polyol.

Suitable urethane catalysts useful in making polyurethane flexible and rigid foams are all those well known to the worker skilled in the art and include tertiary amines like those used to catalyze the acid anhydride/alcohol reaction, such as triethylenediamine, N-methylimidazole, 1,2-dimethylimidazole, N-methyl morpholine, N-ethyl morpholine, triethylamine, tributylamine, triethanolamine, dimethylethanolamine and bis(dimethylaminoethyl) ether, and organotins such as stannous octoate, stannous acetate, stannous oleate, stannous laurate, dibutyltin dilaurate, and other such tin salts.

Other typical agents found in the polyurethane foam formulations include chain extenders such as ethylene glycol and butanediol; crosslinkers such as diethanolamine, diisopropanolamine, triethanolamine and tripropanolamine; blowing agents such as water, liquid carbon dioxide, CFCs, HCFCs, HFCs, pentane, and the like; especially water or water and HCFC, and cell stabilizers such as silicones.

A general polyurethane flexible molded foam formulation having a 1–3 lb/ft$^3$ (16–48 kg/m$^3$) density (e.g., automotive seating) containing a stabilizer/cell opener according to the invention would comprise the following components in parts by weight (pbw):

| Flexible Foam Formulation | pbw |
|---|---|
| Polyol | 20–100 |
| Polymer Polyol | 80–0 |
| Silicone Surfactant | 1–2.5 |
| Stabilizer/Cell Opener | 0.05–3 |
| Water | 1–8 |
| Auxiliary Blowing Agent | 0–4.5 |
| Crosslinker | 0.5–2 |
| Catalyst Composition | 0.1–5 |
| Isocyanate Index | 70–115 |

In the present invention the preferred blowing agent for making the flexible molded foams is water at 1 to 8 parts per hundred polyol (pphp), especially 3 to 6 pphp, optionally with other blowing agents.

A general polyurethane rigid foam formulation containing the stabilizer/cell opener according to the invention would comprise the following components in parts by weight (pbw):

| Flexible Foam Formulation | pbw |
|---|---|
| Polyether Polyol | 100 |
| Silicone Cell Stabilizer | 0–3 |
| Stabilizer/Cell Opener | 0.05–3 |
| Water | 1–8 |
| Auxiliary Blowing Agent | 0–20 |
| Catalyst Composition | 0.1–5 |
| Isocyanate Index (preferabiy TDI) | 85–250 |

Other additives may of course be employed to impart specific properties to the flexible and rigid foams. Examples are materials such as flame retardants, colorants, fillers and hardness modifiers.

The polyurethane foams of this invention may be formed in accordance with any of the processing techniques known to the art, such as, in particular, the "one shot" technique. In accordance with this method, foamed products are provided by carrying out the reaction of the polyisocyanate and polyol simultaneously with the foaming operation. It is sometimes convenient to add the stabilizer/cell opener to the reaction mixture as a premix with one or more of the blowing agent, polyol, water, and catalyst components.

In the following examples the polyurethane foam compositions and the foams were evaluated as follows: A 30.5 cm×30.5 cm×10.2 cm mold at 71° C. was opened and sprayed with a solvent based release agent. Toluene diisocyanate (TDI) was added to a polyol blend comprising the polyols, silicone surfactant, diethanolamine, cell opener, water and amine catalysts and mixed for 5 seconds then poured into the open mold. Pouring was continued until 14 seconds after the start of mixing. The mold was closed and clamped.

At the chosen demold time, the pad was removed from the mold and placed in the force-to-crush (FTC) apparatus. Forty-five seconds after demold time the first compression cycle was started. The force detection device was equipped with a 1000 pound (453.5 kg) capacity pressure transducer mounted between the 50 in$^2$ (323 cm$^2$) circular plate and the drive shaft. The actual pressure was shown on a digital display. The pad was compressed to 50 percent of its original thickness and the force necessary to achieve the highest compression/cycle was recorded. Several compression cycles were completed after which the foam was weighed for calculation of density. A cycle took approximately 30 seconds to complete. This device mimicked the ASTM D-3574, Indentation Force Deflection Test, and provided a numerical value of freshly demolded foams initial hardness or softness. FTC values are reported in the examples in lb/50 in$^2$ and N/323 cm$^2$; the lower the FTC values the more open the foam. (Although multiple compression cycles were performed, only the data for the first three are reported in the tables).

In the Examples and Tables the following materials were used:

Dabco 33LV®—33%TEDA in DPG from Air Products and Chemicals, Inc. (APCI)

Dabco® BL-11/BL-17—blend of tertiary amines from APCI

Dabco BL-19—Bis(dimethylaminoethyl) ether from APCI

Dabco® DC-5169—Silicone copolymer surfactant from APCI

Dabco DC-5164—Silicone copolymer surfactant from APCI

Dabco DC-5043—Silicone copolymer surfactant from APCI

DEOA-LF —Diethanolamine Liq Form (85 DEOA/15 water)

D.I. Water—Deionized water

BEPG—butylether polypropoxyglycol from Dow Chemical (MW=1000)

NPE—nonylphenoxyethoxylate (EO=10) from Union Carbide

TPSA—tetrapropenyl succinic anhydride, a liquid product from Heico Chemical

K-12—Dodecenyl succinic anhydride from Heico Chemical

Neodol 23-3—C12–C13 (EO)$_3$ linear alcohol from Shell Chemical

Polycat® X-FJ1020—blend of tertiary amines from APCI

Polycat 77—tertiary amine from APCI

Polyol 1—EO-PO based triol: OH#=~34; mol wt ~6000

Polyol 2—Polymer polyol based on Polyol 1: OH#=~23

Polyol 3—EO-PO based triol: OH#=~36; mol wt ~4800

Polyol 4—Polymer polyol based on Polyol 3: OH#=~25

Polyol 5—Conventional triol: mol wt ~4800

Polyol 6—SAN graft polymer polyol

EXAMPLES A–C

These examples show the preparation of stabilizer/cell openers according to the invention. Tertiary amine urethane catalyst is added to a flask at room temperature followed by the alcohol and agitation is begun. While continuing agitation, the anhydride is added during which time the temperature is allowed to rise. Agitation is continued until the reaction is complete according to infrared analysis, as indicated by the disappearance of anhydride carbonyl and conversion to ester carbonyl in about 40–60 min. Cell openers A and C were prepared according to this procedure.

The reaction for stabilizer/opener A did not go to completion; analysis of the product by 13C NMR showed that a few percent unreacted Neodol and DDSA existed in the final product. The conversion appeared to proceed to roughly 85%.

Cell Openers A–C were compared to several competitive cell openers in three different water-blown polyurethane foam formulations in the Examples 1–31.

EXAMPLES 1–7

In Example 1–7 stabilizer/openers A and B were evaluated in a TDI flexible molded polyurethane foam prepared from the components (parts by weight; TDI Index=100) as shown in Table 1.

TABLE 1

|  | Example | | | | | | |
|---|---|---|---|---|---|---|---|
|  | 1 | 2 | 3 | 4 | 5 | 6 | 7 |
| Polyol 1 | 50 | 50 | 50 | 50 | 50 | 50 | 50 |
| Polyol 2 | 50 | 50 | 50 | 50 | 50 | 50 | 50 |
| DEOA-LF | 1.76 | 1.76 | 1.76 | 1.76 | 1.76 | 1.76 | 1.76 |
| Water | 3.34 | 3.34 | 3.34 | 3.34 | 3.34 | 3.34 | 3.34 |
| 33-LV | 0.15 | 0.15 | 0.15 | 0.15 | 0.15 | 0.15 | 0.15 |
| BL-11 | 08 | 0.08 | 0.08 | 0.08 | 0.161 | xx | xx |
| BL-17 | xx | xx | xx | xx | xx | 0.21 | xx |
| Opener A | xx | xx | xx | xx | xx | xx | 0.2 |
| XFJ-1020 | 0.6 | 0.6 | 0.6 | 0.6 | xx | xx | xx |
| DC-5169 | 0.6 | 0.6 | xx | xx | 0.6 | 0.6 | 0.6 |
| DC-5164 | 0.2 | 0.2 | xx | xx | 0.2 | 0.2 | 0.2 |
| DC-5508 | xx | xx | 0.6 | 0.6 | xx | xx | xx |
| Opener B | xx | 0.11 | xx | 0.11 | xx | xx | xx |
| FTC |  |  |  |  |  |  |  |
| (lb/N) | 146/650 | 79/352 | 126/561 | 44/196 | 178/792 | 212/943 | 78/347 |
|  | 88/392 | 48/214 | 71/316 | 34/151 | 111/494 | 151/672 | 48/214 |
|  | 631280 | 42/187 | 52/231 | 34/151 | 74/329 | 110/490 | 42/187 |

If a tertiary amine catalyst is not used, the alcohol and anhydride are heated to 100° C. for about 12–14 hours with constant agitation. Cell opener B was prepared according to this latter procedure.

| Cell Opener | A | B | C |
|---|---|---|---|
| Dabco BL-19 | 45 g; 0.281 mol | — | 45 g; 0.281 mol |
| Neodol 23-3 | 30 g; 0.090 mol | 30 g; 0.090 mol | — |
| p-Dodecylphenol | — | — | 35 g; 0.134 mol |
| K-12 | 25 g; 0.094 mol | 25 g; 0.094 mol | 20 g; 0.075 mol |

Conditions for Ex 1–4: 6 min demold, 170 sec TPR for 1 sec. 20% Overpack Conditions for Ex 5–7: 6 min demold, 170 sec TPR for 1 sec, 5% Overpack The data in Table 1 show that cell openers A and B result in the same force to crush improvements (Examples 2 and 7). The use of the acid blocked amine, Dabco BL-17 catalyst, does not provide force to crush benefits as compared to cell openers A and B. Examples 2, 3, and 4 indicate cell opener B is not surfactant dependent.

EXAMPLES 8–15

In Examples 8–15 TDI flexible molded polyurethane foam was prepared from the components (parts by weight; TDI Index=100) as shown in Table 2.

TABLE 2

| | Example | | | | | | | |
|---|---|---|---|---|---|---|---|---|
| | 8 | 9 | 10 | 11 | 12 | 13 | 14 | 15 |
| Polyol 3 | 50 | 50 | 50 | 50 | 50 | 50 | 50 | 50 |
| Polyol 4 | 50 | 50 | 50 | 50 | 50 | 50 | 50 | 50 |
| DEOA-LF | 1.7 | 1.7 | 1.7 | 1.7 | 1.7 | 1.7 | 1.7 | 1.7 |
| Water | 3.6 | 3.6 | 3.6 | 3.6 | 3.6 | 3.6 | 3.6 | 3.6 |
| 33-LV | 0.28 | 0.28 | 0.28 | 0.28 | 0.15 | 0.15 | 0.15 | 0.15 |
| BL-11 | 0.08 | 0.08 | 0.08 | xx | 0.08 | 0.08 | 0.08 | xx |
| Polycat 77 | xx | xx | xx | xx | 0.15 | 0.15 | 0.15 | 0.15 |
| Opener A | xx | xx | xx | 0.125 | xx | xx | xx | 0.125 |
| DC-5043 | 1.0 | 1.0 | 1.0 | 1.0 | 1.0 | 1.0 | 1.0 | 1.0 |
| Opener B | xx | 0.1 | 0.2 | xx | xx | 0.1 | 0.2 | xx |
| FTC | | | | | | | | |
| (lb/N) | 207/923 | 149/664 | 109/486 | 170/758 | 170/758 | 124/553 | 99/442 | 144/642 |
| | 127/566 | 77/344 | 49/219 | 85/379 | 83/370 | 50/223 | 40/178 | 69/308 |
| | 75/335 | 47/210 | 34/152 | 40/214 | 48/214 | 37/165 | 24/107 | 45/201 |

Conditions for Ex 8–15: 6 min demold, 10% Overpack. with no TPR.

The data in Table 2 show that different amine packages can also impact force to crush (FTC). For example, comparison of Examples 8 and 12 illustrate substitution of Polycat 77 catalyst for part of the Dabco 33LV catalyst lowers force to crush. Subsequently, addition of the cell opener B further reduces the force to crush (Examples 9 and 13). Examples 10 and 14 illustrate increase in cell opener use level further reduces force to crush using cell opener B.

Examples 11 and 15 exhibit reduction in force to crush using cell opener A which contains 44% cell opener B.

EXAMPLES 16–31

In these examples Stabilizer/Cell Opener C was compared to a commercially available cell opening, delayed action tertiary amine urethane catalyst in TDI flexible molded polyurethane foams prepared from the components (parts by weight; TDI Index=100) as shown in Tables 3 and 4. Both were evaluated over a broad range of processing conditions, varying the demold time, degree of overpacking, and time of TPR (time pressure relief). The results in Tables 3 and 4 show that cell opener C, over the indicated process conditions, reduces force to crush equally to the commercial catalyst (comm Cat) which is a commercial cell opening, delayed action tertiary amine catalyst for the production of polyurethane foam.

TABLE 3

| | Example | | | | | | | |
|---|---|---|---|---|---|---|---|---|
| | 16 | 17 | 18 | 19 | 20 | 21 | 22 | 23 |
| Polyol 1 | 50 | 50 | 50 | 50 | 50 | 50 | 50 | 50 |
| Polyol 2 | 50 | 50 | 50 | 50 | 50 | 50 | 50 | 50 |
| DEOA-LF | 1.76 | 1.76 | 1.76 | 1.76 | 1.76 | 1.76 | 1.76 | 1.76 |
| Water | 3.34 | 3.34 | 3.34 | 3.34 | 3.34 | 3.34 | 3.34 | 3.34 |
| 33-LV | 0.15 | 0.15 | 0.15 | 0.15 | 0.15 | 0.15 | 0.15 | 0.15 |
| Comm. Cat. | 0.25 | xx | 0.25 | xx | 0.25 | xx | 0.25 | xx |
| Opener C | xx | 0.20 | xx | 0.2 | xx | 0.20 | xx | 0.20 |
| DC-5169 | 0.6 | 0.6 | 0.6 | 0.6 | 0.6 | 0.6 | 0.6 | 0.6 |
| DC-5164 | 0.2 | 0.2 | 0.2 | 0.2 | 0.2 | 0.2 | 0.2 | 0.2 |
| FTC | | | | | | | | |
| (lb/N) | 20/89 | 21/94 | 33/147 | 30/134 | 49/219 | 58/263 | 69/308 | 72/321 |
| | 20/89 | 20/89 | 31/138 | 28/125 | 36/161 | 42/187 | 42/187 | 45/201 |
| | 19/85 | 19/85 | 31/138 | 28/125 | 36/161 | 35/156 | 35/156 | 36/161 |

Conditions for Ex 16–17: 3.5 min demold, 120 sec TPR for 1 sec, 5% Overpack

Conditions for Ex 18–19: 6 min demold, 120 sec TPR for 1 sec, 5% Overpack

Conditions for Ex 20–21: 6 min demold, 170 sec TPR for 5 sec, 20% Overpack

Conditions for Ex 22–23: 3.5 min demold, 170 sec TPR for 1 sec, 20% Overpack

TABLE 4

| | Example | | | | | | | |
|---|---|---|---|---|---|---|---|---|
| | 24 | 25 | 26 | 27 | 28 | 29 | 30 | 31 |
| Polyol 1 | 50 | 50 | 50 | 50 | 50 | 50 | 50 | 50 |
| Polyol 2 | 50 | 50 | 50 | 50 | 50 | 50 | 50 | 50 |
| DEOA-LF | 1.76 | 1.76 | 1.76 | 1.76 | 1.76 | 1.76 | 1.76 | 1.76 |
| Water | 3.34 | 3.34 | 3.34 | 3.34 | 3.34 | 3.34 | 3.34 | 3.34 |
| 33-LV | 0.15 | 0.15 | 0.15 | 0.15 | 0.15 | 0.15 | 0.15 | 0.15 |
| Comm Cat | 0.25 | xx | 0.25 | xx | 0.25 | xx | 0.25 | xx |
| Opener C | xx | 0.20 | xx | 0.20 | xx | 0.20 | xx | 0.20 |
| DC-5169 | 0.6 | 0.6 | 0.6 | 0.6 | 0.6 | 0.6 | 0.6 | 0.6 |
| DC-5164 | 0.2 | 0.2 | 0.2 | 0.2 | 0.2 | 0.2 | 0.2 | 0.2 |
| FTC | | | | | | | | |
| (lb/N) | 34/152 | 38/176 | 28/125 | 28/125 | 49/219 | 53/236 | 71/317 | 75/335 |
| | 34/152 | 35/156 | 26/116 | 26/116 | 28/125 | 30/134 | 43/192 | 48/214 |
| | 35/156 | 33/147 | 26/116 | 26/116 | 22/98 | 23/103 | 38/170 | 39/174 |

Conditions for Ex 24–25: 6 min demold, 120 sec TPR for 1 sec, 20% Overpack

Conditions for Ex 26–27: 3.5 min demold, 120 sec TPR for 5 sec, 20% Overpack

Conditions for Ex 28–29: 3.5 min demold, 170 sec TPR for 5 sec, 5% Overpack

Conditions for Ex 30–31: 6 min demold, 170 sec TPR for 1 sec, 5% Overpack

EXAMPLES D–E

A three neck reaction flask was set up with a stirrer, an addition funnel, a reflux condenser and a method of providing a nitrogen blanket over the reaction mass. Tetrapropenylsuccinic anhydride (TPSA) [134 g; 0.5 moles] was placed in the flask and heated to 100° C. under a nitrogen blanket. Butylether polypropoxyglycol (BEPG) [405 g; 0.5 moles] was added over an hour with continuous agitation. After the addition was completed, the reacting mass was held at 100° for three hours. The material was cooled to room temperature removed from the flask and identified as Cell Opener D.

Using the above procedure and 134 g of TPSA (0.5 moles) was reacted with 330 g of nonylphenolethoxylate [EO=10] (0.5 moles). The resulting product was identified as Cell Opener E.

EXAMPLES 32–35

In Examples 33–35 stabilizer/openers D and E were evaluated in a TDI flexible molded polyurethane foam prepared from the components (parts by weight; TDI Index=100) as shown in Table 5. Example 32 was run without a cell opener.

TABLE 5

| | Example | | | |
|---|---|---|---|---|
| | 32 | 33 | 34 | 35* |
| Polyol 5 | 50 | 50 | 50 | 50 |
| Polyol 6 | 50 | 50 | 50 | 50 |
| DEOA-LF | 1.4 | 1.4 | 1.4 | 1.4 |
| Water | 3.6 | 3.6 | 3.6 | 3.6 |
| 33-LV | 0.15 | 0.15 | 0.15 | 0.15 |
| BL-17 | 0.2 | 0.2 | 0.2 | 0.2 |
| PC-77 | 0.15 | 0.15 | 0.15 | 0.15 |
| DC-5043 | 1.5 | 1.5 | 1.5 | 1.5 |

TABLE 5-continued

| | Example | | | |
|---|---|---|---|---|
| | 32 | 33 | 34 | 35* |
| Opener D | | 0.2 | | |
| Opener E | | | 0.2 | 0.2 |
| FTC | | | | |
| (lb/N) | 84/374 | 66/294 | 38/170 | 20/89 |
| | 36/161 | 34/152 | 22/98 | 19/85 |
| | 25/112 | 26/116 | 21/94 | 20/89 |

*110 sec TPR for 1 sec

Cell opener D in Example 33 afforded a 21% reduction in FTC value. Use of Cell opener E in Example 34 produced a 55% reduction in FTC while Example 35 which also incorporated TPR yielded a 76% reduction in FTC.

STATEMENT OF INDUSTRIAL APPLICATION

The invention affords a method for making water blown polyurethane flexible and rigid foams with improved cell opening.

We claim:

1. In a method for preparing a polyurethane flexible or rigid foam which comprises reacting an organic polyisocyanate with a polyol in the presence of urethane catalyst, a blowing agent, optionally a silicone surfactant cell stabilizer, and a cell opener, the improvement which comprises as the cell opener the mono-ester reaction product of an organic acid anhydride and a C1–C20 hydrocarbyl substituted phenol alkoxylated with 0–20 alkylene oxide units or a C3–C20 primary alcohol alkoxylated with 1–20 alkylene oxide units.

2. The method of claim 1 in which the cell opener comprises the reaction product of the anhydride and a C1–C20 alkyl substituted phenol alkoxylated with 0–20 alkylene oxide units.

3. The method of claim 1 in which the cell opener comprises the reaction product of the anhydride and a C9–C15 primary alcohol containing 1–10 alkylene oxide units or a C4–C6 primary alcohol containing 10–20 alkylene oxide units.

4. The method of claim 1 in which the organic acid anhydride is maleic anhydride, phthalic anhydride or succinic anhydride substituted with a C1–C20 hydrocarbyl group.

5. The method of claim 4 in which the hydrocarbyl group of the succinic anhydride is a C8–C16 hydrocarbyl group.

6. The method of claim 1 in which the anhydride and the phenol or alcohol are reacted in the presence of a tertiary amine urethane catalyst.

7. The method of claim 6 in which the cell opener comprises the reaction product of the anhydride and a C6–C16 alkyl substituted phenol alkoxylated with 0–20 alkylene oxide units.

8. The method of claim 6 in which the cell opener comprises the reaction product of the anhydride and a C9–C15 alcohol containing 1–10 alkylene oxide units or a C4–C6 primary alcohol containing 10–20 alkylene oxide units.

9. The method of claim 6 in which the organic acid anhydride is maleic anhydride, phthalic anhydride or succinic anhydride substituted with a C1–C20 hydrocarbyl group.

10. The method of claim 9 in which the hydrocarbyl group of the succinic anhydride is a C8–C16 hydrocarbyl group.

11. The method of claim 1 in which the blowing agent comprises water or water and HCFC.

12. The method of claim 6 in which the blowing agent comprises water or water and HCFC.

13. In a method for preparing a polyurethane flexible or rigid foam which comprises reacting an organic polyisocyanate with a polyol in the presence of urethane catalyst, a blowing agent comprising water or water and HCFC, optionally a silicone surfactant cell stabilizer, and a cell opener, the improvement which comprises as the cell opener the reaction product of a C1–C20 hydrocarbyl substituted succinic acid anhydride and a C6–C16 alkyl substituted phenol alkoxylated with 5–20 ethylene oxide units, a C9–C15 primary alcohol containing 1–10 ethylene oxide units or a C4–C6 primary alcohol containing 10–20 propylene oxide units, optionally reacted in the presence of a tertiary amine urethane catalyst.

14. The method of claim 13 in which the hydrocarbyl group of the succinic acid anhydride is a C8–C16 hydrocarbyl group.

15. The method of claim 14 in which the succinic acid anhydride is reacted with p-dodecyl phenol, t-butyl phenol, nonyl phenol ethoxylated with about 10 ethylene oxide units, butanol propoxylated with about 16–17 propylene oxide units or an ethoxylated linear primary alcohol in which the alcohol comprises a mixture of C12 and C13 linear primary alcohols which are ethoxylated with 3 moles of ethylene oxide.

16. A polyurethane flexible foam composition comprising the following components in parts by weight (pbw):

| | |
|---|---|
| Polyol | 20–10 |
| Polymer Polyol | 80–0 |
| Silicone Surfactant | 1–2.5 |
| Stabilizer/Cell Opener | 0.05–3 |
| Water | 1–8 |
| Auxiliary Blowing Agent | 0–4.5 |
| Crosslinker | 0.5–2 |
| Catalyst Composition | 0.1–5 |
| Isocyanate Index | 70–115 | the stabilizer/cell opener comprising the mono-ester reaction product of an organic acid anhydride and a C1–C20 hydrocarbyl substituted phenol alkoxylated with 0–20 alkylene oxide units or a C3–C20 primary alcohol alkoxylated with 1–20 alkylene oxide units.

17. The flexible foam composition of claim 16 in which the anhydride and the phenol or alcohol are reacted in the presence of a tertiary amine urethane catalyst.

18. The flexible foam composition of claim 16 in which the stabilizer/cell opener comprises the reaction product of a C1–C20 hydrocarbyl substituted succinic acid anhydride and a C6–C16 alkyl substituted phenol alkoxylated with 5–20 ethylene oxide units, a C9–C15 primary alcohol containing 1–10 ethylene oxide units or a C4–C6 primary alcohol containing 10–20 propylene oxide units, optionally reacted in the presence of a tertiary amine urethane catalyst.

19. A polyurethane rigid foam composition comprising the following components in parts by weight (pbw):

| | |
|---|---|
| Polyether Polyol | 100 |
| Silicone Cell Stabilizer | 0–3 |
| Stabilizer/Cell Opener | 0.05–3 |
| Water | 1–8 |
| Auxiliary Blowing Agent | 0–20 |
| Catalyst Composition | 0.1–5 |
| Isocyanate Index | 85–250 | the stabilizer/cell opener comprising the mono-ester reaction product of an organic acid anhydride and a C1–C20 hydrocarbyl substituted phenol alkoxylated with 0–20 alkylene oxide units or a C3–C20 primary alcohol alkoxylated with 1–20 alkylene oxide units.

20. The rigid foam composition of claim 19 in which the stabilizer/cell opener comprises the reaction product of a C1–C20 hydrocarbyl substituted succinic acid anhydride and a C6–C16 alkyl substituted phenol alkoxylated with 5–20 ethylene oxide units, a C9–C15 primary alcohol containing 1–10 ethylene oxide units or a C4–C6 primary alcohol containing 10–20 propylene oxide units, optionally reacted in the presence of a tertiary amine urethane catalyst.

* * * * *